(No Model.)

2 Sheets—Sheet 1.

J. W. BYRNE.
OSCILLATING WATER METER.

No. 332,637.  Patented Dec. 15, 1885.

WITNESSES
Frank G. Parker
Chas. Spaulding

INVENTOR
Joseph W. Byrne (No Model.)   2 Sheets—Sheet 2.

J. W. BYRNE.
OSCILLATING WATER METER.

No. 332,637. Patented Dec. 15, 1885.

WITNESSES.  
Wm. P. Cook  
William Edson

INVENTOR.  
Joseph W. Byrne.

UNITED STATES PATENT OFFICE.

JOSEPH W. BYRNE, OF BOSTON, MASSACHUSETTS.

OSCILLATING WATER-METER.

SPECIFICATION forming part of Letters Patent No. 332,637, dated December 15, 1885.

Application filed February 9, 1885. Serial No. 155,422. (No model.)

*To all whom it may concern:*

Be it known that I, JOSEPH W. BYRNE, of Boston, in the county of Suffolk and State of Massachusetts, have invented a new and useful Improvement in Water-Meters, of which the following, taken in connection with the accompanying drawings, is a specification.

My invention relates to that class of meters in which a tilting vessel is used within an air-tight cylinder, a part of the cylinder being filled with water and a part with air, the water being admitted from the top through a pipe which discharges into one compartment of the meter-vessel and then into another in alternation, each tilting of the meter being registered by an automatic device similar to that used in ordinary gas-meters.

The object of my invention is to construct a meter that shall operate to measure accurately and not be expensive. This object I attain by the mechanism shown in the accompanying drawings, in which—

Figure 1:
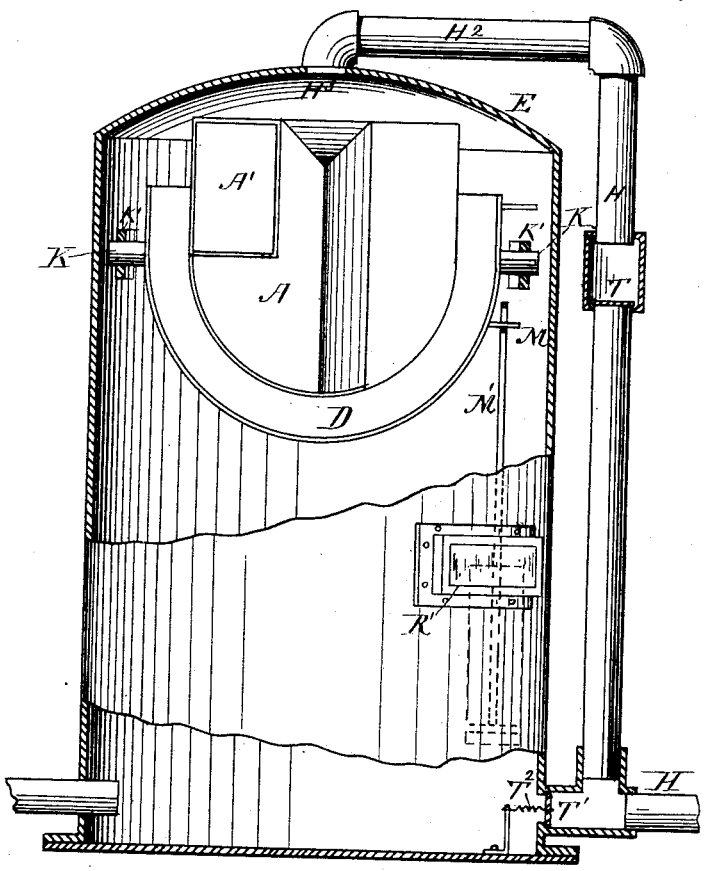
Figure 3:
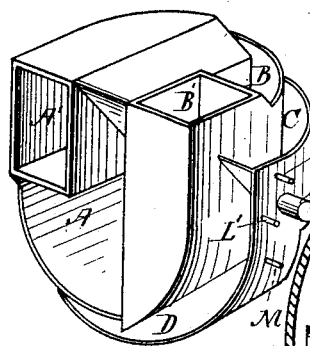
Figure 2:
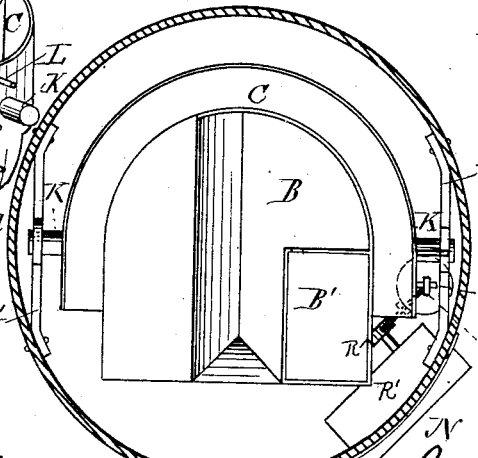
Figure 4:
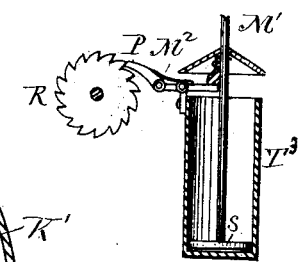
Figure 5:
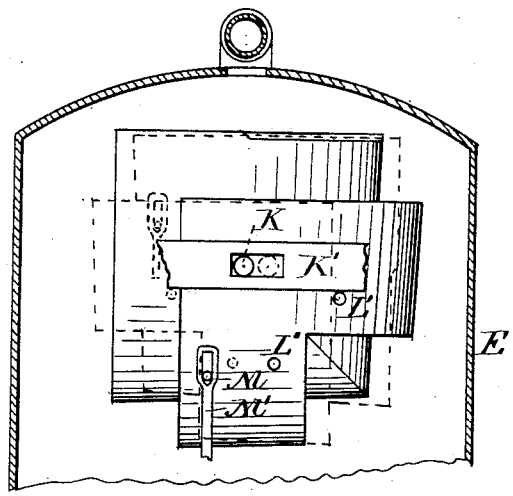
Figures 6, 7:
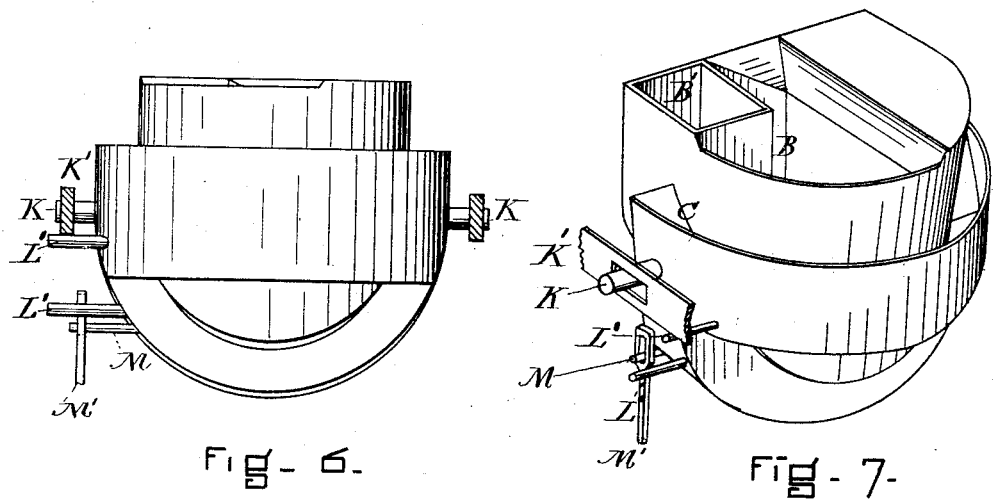

Figure 1 is a view partly in elevation and partly in section. Fig. 2 is a plan. Fig. 3 is a perspective of the meter-vessel. Fig. 4 is a detail showing the registering device. Fig. 5 shows a side of the meter-vessel. Fig. 6 is a rear elevation of the meter-vessel, and Fig. 7 is a perspective view of the meter-vessel.

In the drawings, E represents a cylindrical air-tight tank. H H² H³ is a conduit leading from the water-supply to the meter and discharging at H³. Immediately below the orifice H³, I place the meter-vessel, which is hung on trunnions K K. This meter-vessel is hung on the trunnions K, which turn in brackets K' K', Figs. 1, 2, 5, 6, and 7, the motion of which is limited by pins L' L', situated, as shown in Figs. 5, 6, and 7, so that the entire oscillation of the meter-vessel covers an angle of ninety degrees only.

Within the outer cylindrical tank, E, Figs. 1, 2, 5, already described, I place the meter-vessel, which is divided into six receptacles, A, A', B, B', C, and D, all of which are shown in Fig. 3, and some of which are shown in Figs. 1, 2, and 7. The receptacles A, A', and D are of the same shape as the corresponding receptacles, B, B', and C; but their open ends occupy different sides of the meter-vessel, as shown in Fig. 3. The outside casings of the receptacles A, B, C, and D, Fig. 3, are made with a slight pitch to insure the thorough discharge of water. The water-receiving space A, Figs. 1 and 3, takes water directly from the orifice H³, but is connected to A' by a small opening (not shown in the drawings) near the bottom of the partition that divides A from A', so that some of the water can flow into the balance-tank A'. The object of this opening is to insure accuracy of measurement under varying flow of water into meter-vessel, as if water flows with great rapidity receptacle A will receive in the act of tipping more water than it would if water flowed slowly; but the compartment A' will become only partly filled through opening connecting A and A', and thus compensate for the surplus of water in A. The same takes place in regard to B and B'.

As the two adjacent sides of this vessel present similar compartments, it will be understood that each oscillation back and forth of the meter-vessel represents the same flow of water.

To register the oscillations of the meter-vessel, I connect it, by means of the pin M, Figs. 1, 5, 6, and 7, to a piston-rod, M'. This piston-rod M' operates a lever, M², (see Fig. 4,) and a pawl, P, which in turn operates on the ratchet-wheel R, and thus communicates motion to the registering device R'. The upper end of the piston-rod M' is slotted, as shown in Fig. 5, so that the pin M does not immediately move the rod M' upon the beginning of the oscillating movement of the meter-vessel, so that although the meter-vessel may begin to move rapidly its velocity will be checked by the action of the piston S, Fig. 4, which is connected to the rod M'. This piston S, being inclosed in the tube T³, in which it loosely fits, is retarded in its motion by the slow influx of water beneath it.

I will now describe the cause of motion of my meter-vessel. As the water flows into the compartment B, it will gradually fill the same, (and as the gravity of the water in this apartment is centered beneath the trunnions K no oscillation takes place) until the compartment B is full. Then the water will overflow into the compartment C, and thus tip the meter-vessel over and empty it. While the meter-vessel is discharging its contents from B, B', and C the compartments A, A', and D are in position to receive water. The tank E is only partly filled with water at any time, so that the meter-vessel is free to turn.

T and T', Fig. 1, represent check-valves. The upper one, T, is situated in the vertical section of the supply-pipe, and opens upward in the direction of the flow of water into the meter, while the lower one, T', opens outward from the cylinder E, and is held to its seat by means of a small spiral, T², Fig. 1.

To save friction, I have the trunnions K roll in longitudinal slots formed in the bracket K', Figs. 5 and 7.

I claim—

1. In a water-meter, the combination of the oscillating meter-vessel having compartments A, A', B, B', C, and D, with the cylinder E, and supply-pipes H H² H³, all operating together substantially as described, and for the purposes set forth.

2. In the water-meter, the combination of the chamber E, the oscillating meter-vessel A, A', B, B', C, and D, with the registering device consisting of the pin M, the piston-rod M', the piston S, tube T³, lever M², pawl P, and registering-wheel R, all operating together substantially as described, and for the purpose set forth.

JOSEPH W. BYRNE.

Witnesses:
FRANK G. PARKER,
WM. P. COOK.